United States Patent
Sandelin et al.

(10) Patent No.: US 9,701,039 B2
(45) Date of Patent: *Jul. 11, 2017

(54) CHOPPING AID DEVICE

(71) Applicant: Fiskars Brands Finland Oy Ab, Billnäs (FI)

(72) Inventors: Teemu Sandelin, Helsinki (FI); Mikko Heine, Helsinki (FI); Mika Sokka, Tuusula (FI)

(73) Assignee: Fiskars Finland Oy Ab, Helsinki (FI)

( * ) Notice: Subject to any disclaimer, the term of this patent is extended or adjusted under 35 U.S.C. 154(b) by 324 days.

This patent is subject to a terminal disclaimer.

(21) Appl. No.: 14/133,051

(22) Filed: Dec. 18, 2013

(65) Prior Publication Data

US 2014/0175723 A1 Jun. 26, 2014

(30) Foreign Application Priority Data

Dec. 20, 2012 (FI) ...................................... 20126350

(51) Int. Cl.
 *B27L 7/00* (2006.01)
 *B27L 7/08* (2006.01)
 *B29C 45/16* (2006.01)

(52) U.S. Cl.
 CPC ....... *B27L 7/00* (2013.01); *B27L 7/08* (2013.01); *B29C 45/1676* (2013.01)

(58) Field of Classification Search
 CPC ..................................... B27L 7/00; B27L 7/08
 See application file for complete search history.

(56) References Cited

U.S. PATENT DOCUMENTS

| | | | |
|---|---|---|---|
| 148,078 A * | 3/1874 | Mayell | B65B 67/12 248/101 |
| 182,659 A * | 9/1876 | Green | B65B 67/12 248/101 |

(Continued)

FOREIGN PATENT DOCUMENTS

| CZ | 6499 | 9/1997 |
|---|---|---|
| CZ | 6499 A3 * | 9/1997 |

(Continued)

OTHER PUBLICATIONS

National Board of Patents and Registration of Finland Search Report for Finland Application No. 20126350, dated Sep. 18, 2013, 1 page.

(Continued)

*Primary Examiner* — Larry E Waggle, Jr.
*Assistant Examiner* — Tyrone V Hall, Jr.
(74) *Attorney, Agent, or Firm* — Foley & Lardner LLP

(57) ABSTRACT

A chopping aid device for use in chopping of firewood prevents pieces of wood from spreading into the surroundings outside the chopping aid device during chopping. The chopping aid device includes a basket-like cuff frame for chopped wood. In order to make the chopping aid device durable against mishits and to prevent the blade of the axe from becoming blunt in case of mishits by the axe, the cuff frame is made of an elastomeric material providing dampening characteristics against impacts and an upper edge of the cuff frame is covered with a collar made of a harder material than the cuff frame and providing protection of the cuff frame against cuts. A method for manufacturing a chopping aid device is also provided.

11 Claims, 3 Drawing Sheets

(56) References Cited

U.S. PATENT DOCUMENTS

| | | | | |
|---|---|---|---|---|
| 1,026,721 | A | 5/1912 | Thomas | |
| 1,149,525 | A * | 8/1915 | Kennedy | B26D 7/01 269/54.3 |
| 1,414,575 | A * | 5/1922 | McCart | B65B 67/12 248/101 |
| 1,823,608 | A | 9/1931 | Kalkanis | |
| 2,678,764 | A * | 5/1954 | Carlson | B65D 25/16 141/365 |
| 2,751,951 | A | 6/1956 | Strathaus | |
| 3,169,760 | A * | 2/1965 | Field | B27L 7/00 248/526 |
| 3,561,637 | A * | 2/1971 | McConnell | B65D 45/32 220/320 |
| 3,713,463 | A * | 1/1973 | Bywater, Jr. | F16L 55/115 138/89 |
| 3,818,956 | A * | 6/1974 | Chamberlain | B65B 67/12 141/316 |
| 4,326,703 | A * | 4/1982 | Marley | B27L 7/08 248/523 |
| 4,468,018 | A * | 8/1984 | Vaizey | B27B 17/0075 269/166 |
| 4,515,195 | A * | 5/1985 | Gladstein | B27L 7/00 144/195.6 |
| 4,998,643 | A * | 3/1991 | Pradel | B65D 45/32 220/320 |
| 5,397,085 | A * | 3/1995 | Spagnolo | B65B 67/12 248/101 |
| 6,568,430 | B1 * | 5/2003 | Shafer | F16L 55/1157 138/89 |
| 7,731,074 | B2 * | 6/2010 | Martin | B23K 3/022 228/51 |
| 9,333,671 | B2 * | 5/2016 | Huhtala | B27L 7/08 |
| 9,366,368 | B2 * | 6/2016 | Hausl | F16L 21/005 |
| 2002/0114870 | A1 * | 8/2002 | Rebhorn | A23C 9/154 426/120 |
| 2006/0097524 | A1 * | 5/2006 | Stolzman | B65D 45/345 292/256.69 |
| 2007/0029215 | A1 * | 2/2007 | Martinez | E04F 21/00 206/223 |
| 2008/0073361 | A1 * | 3/2008 | Brouard | B27L 7/08 220/669 |
| 2010/0225039 | A1 * | 9/2010 | MacLean | B25H 1/00 269/289 R |
| 2011/0049780 | A1 * | 3/2011 | Bowers | B25H 1/08 269/295 |
| 2012/0205376 | A1 * | 8/2012 | Yang | B65D 51/246 220/212 |

FOREIGN PATENT DOCUMENTS

| | | | | |
|---|---|---|---|---|
| DE | 3202062 A1 * | 8/1983 | | B27L 7/08 |
| DE | 19703829 | 8/1998 | | |
| DE | 20117428 | 1/2002 | | |
| DE | 202004011826 | 12/2004 | | |
| DE | 20 2005 001 959 | 5/2005 | | |
| DE | 102004063195 A1 * | 7/2006 | | B27L 7/08 |
| DE | 20 2009 004 211 | 9/2009 | | |
| EP | 1886779 | 2/2008 | | |

OTHER PUBLICATIONS

National Board of Patents and Registration of Finland Search Report for Finland Application No. 20126351, dated Sep. 23, 2013, 1 page.

US Office Action, U.S. Appl. No. 14/133,132, 7 pages. (Jun. 19, 2015).

First Office Action and English translation for CN Application No. 201310710949.6, dated Jul. 11, 2016, 16 pages.

* cited by examiner

CHOPPING AID DEVICE

CROSS REFERENCE TO RELATED APPLICATIONS

This Application claims the benefit of priority to Finnish patent application No. 20126350, which was filed on Dec. 20, 2012, the complete disclosure of which is incorporated by reference herein.

BACKGROUND OF THE INVENTION

The invention relates to a chopping aid device for use in chopping of firewood to prevent pieces of wood to spread into the surroundings outside the chopping aid device during chopping, the chopping aid device comprising a basket-like cuff frame for chopped wood.

The invention relates also to a method for manufacturing a chopping aid device for use in chopping of firewood to prevent pieces of wood to spread into the surroundings outside the chopping aid device during chopping, the method comprising molding of a basket-like cuff frame for chopped wood.

Such a chopping aid device is known from patent publication EP 1886779 B1. This known device in the form of a basket-like closed ring frame is designed to be mounted onto a chopping block and designed to prevent chopped wood to fall to the ground from the chopping block. By having this function, the chopping aid device provides at the same time for the user, and for people nearby the chopping aid device, safety in that chopped wood does not fly and hit the user or the people nearby. In order not to damage the cutting edge of the axe caused by mishits against the upper edge or other parts of the cuff frame, the cuff frame is made of plastic. A problem with this prior art chopping aid device is, however, that one or more mishits against the upper edge of the cuff frame will break the cuff frame. This is the case despite suggested insections to be made in the cuff frame. These insections provide only partial protection of the chopping aid device against mishits. A further problem with this prior art chopping aid device is that there is a risk of the axe bouncing pass the chopping block and hitting on the ground or on the knee/leg/foot of the person who is chopping.

BRIEF DESCRIPTION OF THE INVENTION

An object of the invention is to provide a new chopping aid device, to be used for chopping firewood, which device is durable and is able to stand numerous mishits by the axe without being damaged.

The chopping aid device of the invention is characterized in that the cuff frame is made of an elastomeric material providing dampening characteristics against impacts and in that an upper edge of the cuff frame is covered with a collar made of a harder material than the cuff frame and providing protection of the cuff frame against cuts.

An essential idea of the invention is to arrange a relatively hard collar on top of a resilient cuff frame, whereby the cuff frame will absorb energy from a mishit on the cutting aid device to that extent that the relatively hard collar will not break, and, at the same time the relatively hard collar will protect the blade of the axe from making cuts into the cuff frame thus preventing the cuff frame from being damaged. In other words, the cuff frame prevents, by providing dampening properties, the collar from being damaged by the impact of the axe, and the collar prevents the blade of the axe to cut into the cuff frame.

The hardness of the collar material is below the hardness of the blade of the axe to prevent the blade from becoming blunt. Preferably the hardness of the collar is 90 to 120 on the Rockwell R-scale. If Rockwell B-scale is applied for measuring the hardness, the hardness should not exceed the value 45.

Preferably the cuff frame and the collar are open at the front side or user side. This prevents the handle of the axe from hitting the cuff frame when chopping. An open cuff frame can preferably be realized by a cuff frame which comprises an upper edge whose distance from the bottom of the cuff frame is smaller at the front side or user side than the distance from the bottom at a side which differs from the front side.

Preferred embodiments of the chopping aid device according to the invention are disclosed in the attached claims.

The most important advantages of the chopping aid device according to the invention are that it is durable against mishits and it prevents the blade of the axe from becoming blunt in case of mishits by the axe. The chopping aid device prevents also the axe from bouncing astray during splitting. An embodiment of the chopping aid device comprising a straining strap attached to a bottom of the cuff frame makes the chopping aid device suitable for attaching it to chopping blocks of different size. Such a chopping aid device is comfortable to use, and the cuff frame prevents the wood to be chopped form falling on the ground.

The method for manufacturing a chopping aid device according to the invention is characterized by injection molding the cuff frame of an elastomeric material providing dampening characteristics against impacts and by injection molding, in a same injection molding machine, on top of the cuff frame a collar made of a harder material than the cuff frame.

An important advantage of the method according to the invention is that it enables fast manufacturing of a very durable chopping aid device where the collar is firmly attached to the cuff frame

BRIEF DESCRIPTION OF THE FIGURES

In the following the invention will be described in closer detail by means of two embodiments and with reference to the accompanying drawing in which.

DETAILED DESCRIPTION OF THE INVENTION

Figure 1:
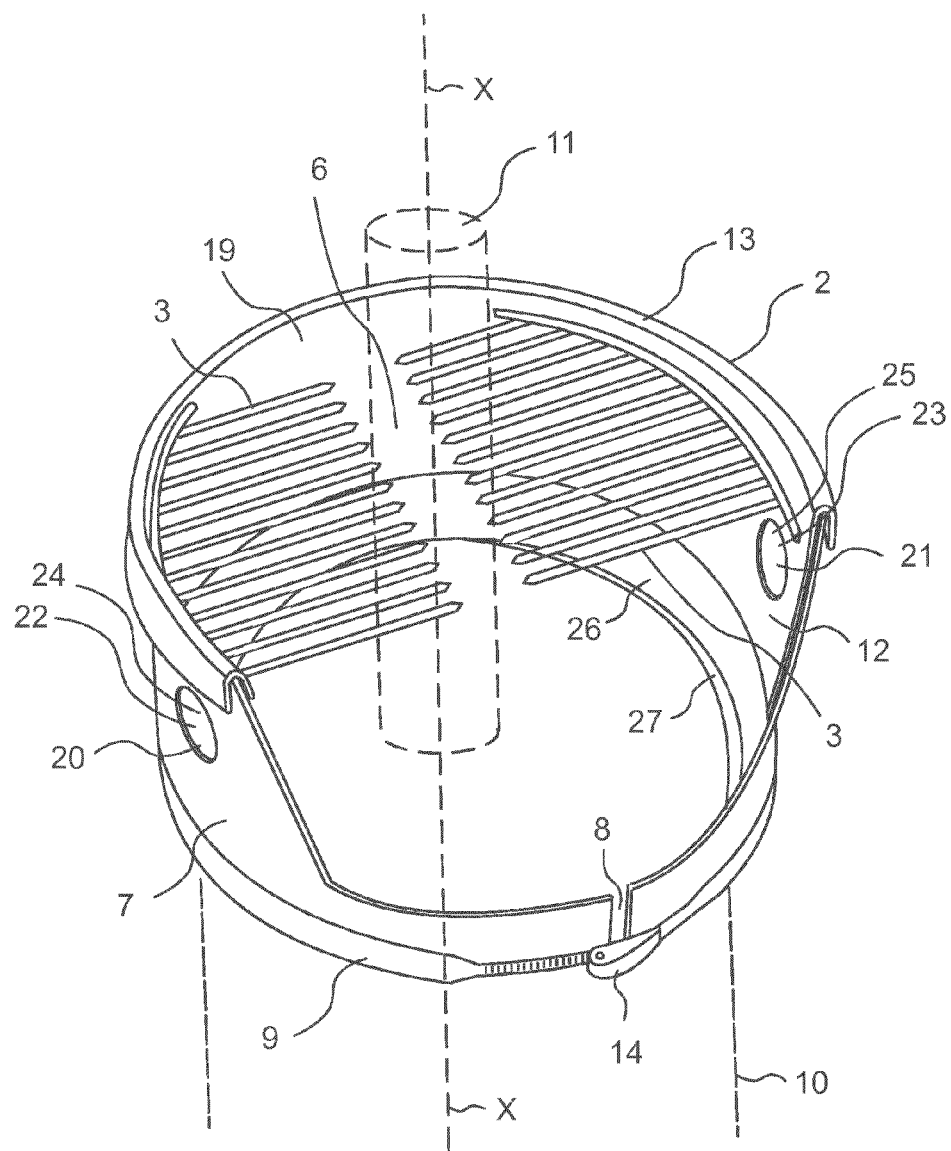
FIG. 1 shows the first embodiment of the chopping aid device mounted on a chopping block.

In FIG. 1 the chopping aid device is shown mounted on top of a chopping block 10 drawn with broken line. The chopping aid device has been tightened around the chopping block with a buckle or straining strap 9. The chopping aid device lies with a bead 27 on the upper surface of the chopping block 10. The bead 27 prevents wood debris from being accumulated in possible gaps between the chopping block 10 and the chopping aid device. It is, however, possible to lower the chopping aid device from the position shown in FIG. 1 to a position where the bead 27 encircles the chopping block 10 by first moving it downwards in the vertical direction and thereafter tightening the straining strap 9 using the tightening and locking device 14 of the straining strap. Such lowering may be desirable in order to provide good support for very short logs to be chopped. For reasons of simplicity, in the figure only one wood 11 to be chopped has been drafted.

As illustrated in FIG. 1, the woods are placed vertically within the chopping aid device. A plurality of flexible spikes 3 support the wood 11 to be chopped. The spikes have a diameter of e.g. 1 to 2 mm, but the diameter can vary much depending on the material of the spikes, the size of the logs to be split, etc. If very thin spikes 3 are used (diameter 1 mm or less), the spikes can be called bristles. When the wood 11 is positioned within the chopping aid device, the spikes 3 adjacent the wood bend downwards thus providing a lateral force on the wood. By bending downwards, the risk of cutting or damaging in another way the spikes with an axe (not shown in the figures), is also reduced. The lateral force of the spikes 3 supports the wood and ensures that the wood 11 is positively kept upright within the chopping aid device even if the cross-section of the wood supporting the wood from below does not, as such, provide adequate support owing to the reason that it is not at right angles to the longitudinal axis of the wood. Thanks to the spikes 3, the wood 11 is positively kept upright before it is hit with an axe (not shown) and also after it has been split with the axe. The next hit with the axe can immediately be carried out without an intermediate need to touch the wood.

The chopping aid device comprises a basket-like cylindrical cuff frame 1 made of flexible elastomeric material, i.e. a material which can undergo much elastic deflection under mechanical stress and still return to its original size without permanent deflection. The elastomeric material is e.g. rubber, Thermo Plastic Elastomer (TPE), Polypropylene (PP) or Polyethylene (PE). A suitable Shore A hardness for the cuff frame 1 is 30 to 70. The Shore A hardness of the cuff frame 1 can, however be within the range 20 to 80. The bottom 5 of the cuff frame 1 is arranged around the upper end of the chopping block 10. The cuff frame 1 is circumferentially open having a peripheral wall 26 which is non-continuous by comprising a slot 8 at the front side or user side. The slot 8 enables to easily adjust the diameter of the bottom of the cuff frame 1 making it easy to position the cuff frame around chopping blocks 10 of different size. By tightening the straining strap 9, the cuff frame 1 will steadily be fastened to the chopping block 10. The diameter of the cuff frame 1 is preferably about 400 mm. Such a cuff frame can easily be fastened to chopping blocks 10 having diameters between 300 to 500 mm.

Because the cuff frame 1 is resilient, it will dampen the impact on the chopping aid device if the device is accidentally hit on by the axe. To protect the cuff frame 1 form being damaged by an accidental hit, a cylindrical collar 7 has been mounted on top of the cuff frame 1. The collar 7 is made of a harder material than the cuff frame 1, e.g. from polyamide (nailon) Glassfiber reinforced Polyamide (PA) or Glassfiber reinforced Polybutylene terephthalate (PBT) having a hardness of 90 to 120 on the Rockwell R-scale. The hardness of the collar 7 can, however, be within the range 50 to 130 on the on the Rockwell R-scale, and instead of polyamide some other plastic than polyamide could be used. If the hardness of the collar 7 is too high, the collar is prone to breaking. Preferably the collar 7 is capable of flexing. It is conceivable to fabricate the collar 7 of some soft metal, such as aluminum having a hardness below 45 on the Rockwell B-scale. The collar 7 distributes the force of the accidental hit to a large area of the cuff frame 1 thus preventing the blade of the axe to cut into the cuff frame 1. Even a relatively strong hit on the collar 7 will not damage the collar, because the flexible cuff frame 1 under the collar dampens effectively the hit, and the collar is capable of being scratched by the blade. An advantage by making the collar 7 as a detachable component from the cuff frame 1 is, that the collar 7 can easily be replaced after wear.

Figure 2:
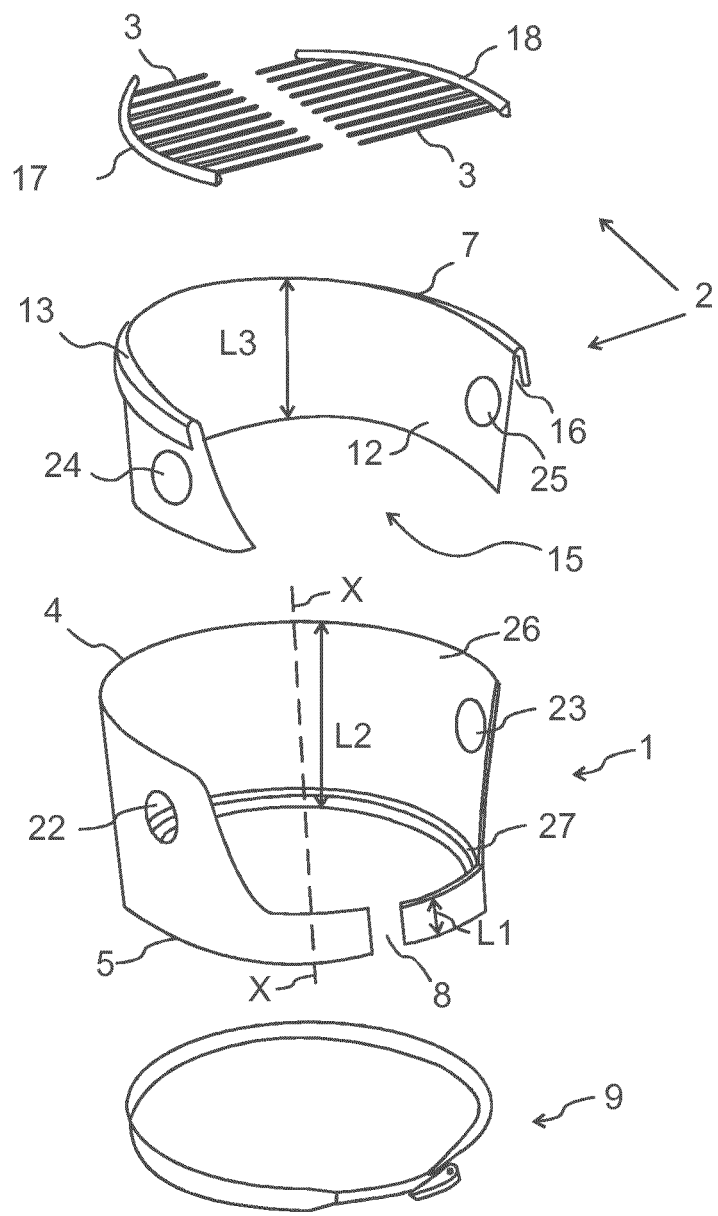
FIG. 2 shows the chopping aid device of FIG. 1 in an exploded view.

FIG. 2 shows the components of the chopping aid device of FIG. 1. The device comprises a cylindrical collar 7 to be mounted on top of the cuff frame 1. The collar 7 covers a major part, typically 40 to 80%, corresponding to 180 to 290 degrees of a circle, of the upper edge 4 of the cuff frame 1. The spikes 3 are detachably attached to the collar 7 in order to make replacement of worn and damaged spikes easy. Thus the spikes 3 are indirectly, by means of the collar 7 fastened to the cuff frame 1. The spikes 3 and the collar 7 together form a support 2 to keep the wood 11 to be chopped upright and also to keep the chopped firewood upright. The spikes 3 are horizontal with respect to the collar 7 and the cuff frame 1.

The distance from the bottom 5 of the cuff frame 1 to the upper edge 4 of the frame varies in such a way that the distance L1 at the front side or user side of the chopping aid device is much smaller than the distance L2 at the rear side of the chopping aid device, or at any other direction which differs from the front side. In this way the cuff frame 1 is open at the front side. The opening at the front side of the cuff frame 1 gives space for the handle of the ax (not shown) when firewood is chopped and makes it easy to clean the upper surface of the chopping block 10 from wood debris. The distance L2 is preferably about 200 mm. The distance L1 can be e.g. 20-50 mm.

The collar 7 has a peripheral wall 12 which is non-continuous so that it comprises a peripheral opening 15. When the collar 7 is put on top of the cuff frame 1, the opening 15 of the collar 7 is aligned with the front side of the cuff frame 1. The opening 15 (like the opening of the cuff frame 1) gives space for the handle of the axe when firewood is chopped.

The collar 7 is detachably fastened to the cuff frame 1. For this purpose the upper edge 13 of the collar 7 comprises a groove 16 to receive the upper edge 4 of the cuff frame 1. The height L3 of the collar 7 must be less than the height L2 of the cuff frame 1 because the collar 7 must not hit the upper end of the chopping block 10 if the axe accidentally hits on the collar. If the distance L2, i.e. the maximum height of the cuff frame 1 is about 200 mm, the height L3 of the collar 7 is preferably 150-180 mm. In normal use of the chopping aid device, the collar 7 is fastened to the cuff frame 1 in such a way that the opening 15 thereof faces the user, c.f. FIG. 1. However, the collar 7 can alternatively be positioned on the cuff frame 1 in such a way that the opening 15 thereof is diametrically opposite to the opening of the cuff frame 1. Such a positioning of the collar 7 gives as result a chopping aid device having fully closed walls and no opening facing the user. Fully closed walls and detached spikes 3 allow to easily fill up the whole cross-section of the chopping aid device with woods. Because the collar 7 can be rotated 0 to 180 degrees with respect to the cuff frame 1, it can be positioned on top of the cuff frame 1 so that the opening 15 thereof points at any desired direction.

The spikes 3 have been fastened at two arcs 17, 18 which, in turn, are detachably fastened to the collar 7, e.g. by snap-fasteners, which can be of pin-hole type.

As can be seen from FIGS. 1 and 2, the spikes 3 are directed horizontally to a longitudinal axis X-X of the cuff frame 1. The spikes 3 are fastened at opposite sides of the collar 7 so that two rows of spikes 3 are formed. The spikes 3 of one row are directed against the spikes 3 in the other row leaving between the free ends, i.e. between the tips of the spikes of respective row, a narrow slot-like zone 6 which is free of spikes. The width of the zone 6, against which the free ends of the spikes 3 are directed, is 10 to 50 mm. The zone 6 is directed against the user and the spikes 3 are at right angles to the user.

Thanks to said arrangement of the spikes 3, the spikes 3 effectively prevent the wood from moving against the user when the wood is chopped and they also prevent the wood from collapsing within the cuff frame 1. Also, the spikes 3 are short enough (shorter than the height of the chopping aid device) so that the tips thereof do not reach the upper surface of the chopping block 10 when they are bent downwards. Owing to this, the spikes cannot be cut by being pinched between the axe and the upper surface of the chopping block 10 The angle of the spikes 3 in relation axis X-X and to the front side of the chopping aid device, and the user, does not have to be a right angle; however, an obtuse angle with respect to the front-rear-line of the chopping aid device is preferred.

To make the chopping aid device easier to manufacture and also to avoid charging of logs too close to the margins of the chopping aid device, in which case the risk of mishits including hits on the edge of the chopping aid device increases, there is also at the rear side of the chopping aid device a segment 19 free of spikes as seen from FIG. 1. The front side of the chopping aid device has a similar segment (however, not shown by reference numeral) free of spikes. The spikes 3 cover at least 70% of the cross-sectional area of the cuff frame 1. In said figure of 70% not only the total projection area of the individual spikes 3 but also the areas of the gaps between adjacent spikes are included.

The chopping aid device comprises handles 20, 21 in order to make it easy to lift and move. The handles 20, 21 are formed of holes 22, 23 and 24, 25 made in the cuff frame 1 and collar 7, respectively. The holes 22 and 23, like the holes 24 and 25 are preferably spaced 180 degrees apart. The holes 23 to 25 are not, however, indispensable as the chopping aid device is not heavy.

Figure 3:
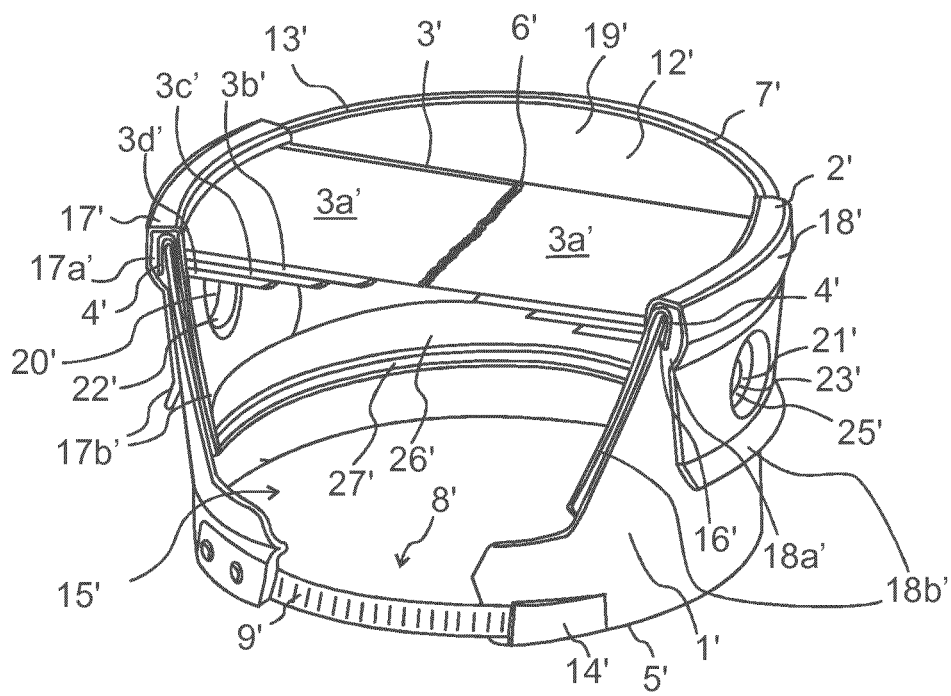
FIG. 3 shows the second embodiment of the chopping aid device.

FIG. 3 shows another embodiment of the chopping aid device. In FIG. 3 has been used similar reference numerals as in FIG. 1 for corresponding components. For the sake of simplicity only one spike 3' has been separately drafted in FIG. 3 although the number of spikes in the support 2' is large, like in the embodiment of FIG. 1.

The embodiment of FIG. 3 differs from the embodiment of FIG. 1 in that the spikes 3' are arranged in four levels 3a', 3b', 3c', 3d'. The length of the spikes 3' in the different levels 3a', 3b', 3c', 3d' diminishes in the direction downwards so that the average length of the spikes in a lower level, e.g. level 3c', is shorter than the average length of the spikes in an upper level, 3b' or 3a'. Such an arrangement of the spikes 3' has the advantage that it provides better support for the woods to be chopped by adding more progressive support force when more wood is added and prevents the creeping and permanent deflection of longer spikes by supporting them from underneath with shorter spikes which are less prone to creepage and deflection caused by gravity.

Figure 4:
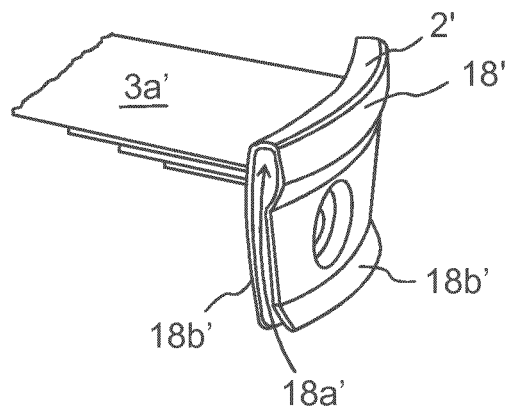
FIG. 4 shows a detail of the chopping aid device of FIG. 3.

The embodiment of FIG. 3 differs from the embodiment of FIG. 1 further in that the spikes 3' are fastened to arcs in the form of holders 17', 18' which are fastened to the collar 7' by means of grooves 17a', 18a'. The holders 17', 18' also comprise branches 17b', 18b' the lower edge of which press against the cuff frame 1 and the collar 7. From FIG. 4, which shows the holder 18' separately from the support 2', the groove 18a' is clearly seen. In FIG. 3 the groove 18a' receives the upper edge 13' of the collar 7'. The advantage of the groove 18a' is that the holder 18' is easy to position in place on the collar 7' and remove from the collar 7'. The holders 17', 18' of the embodiment of FIG. 3 also make it very easy to position the spikes 3 of two holders 17', 18' in such a way that the spikes 3' are in line regardless variations in diameter of the chopping block.

Still further the embodiment of FIG. 3 differs from the embodiment of FIG. 1 in that the width of the zone 6' free of spikes is negligible small.

Deviating from what has been disclosed in the two embodiments, it is possible to implement the chopping aid device by integrating the collar (c.f. collar 7, 7') with the cuff frame (c.f. cuff frame 1, 1'). This can e.g. be carried out by two component molding. The collar is injection molded of a material providing a support durable against cuts, and the cuff frame is, in the same injection molding machine, injection molded of a material providing a cuff frame which is flexible and resilient. Preferable materials to be used for the collar and the cuff frame have been disclosed above.

The invention has been described above only by examples. It shall be understood that the invention can be implemented in many ways within the scope of the attached claims. Hence, it is for instance possible, that the cuff frame has a geometrical form which is not cylindrical: the cross-section of the device can be elliptic or square. However, a cylindrical form is preferable, because a cylindrical cuff frame is easy to position on top of a chopping block. The bead in the inner wall of the cuff frame 1 is not indispensable, but is highly preferable, because it gives stability to the chopping aid device. The zone 6 in the central area of the cross-section of the cuff frame 1 need not have the form of a slot; it can e.g. have the form of a circle or some other form. The chopping aid device need not have any spikes at all, although spikes are highly recommendable in order to make the chopping of wood easy, fast and very safe.

The invention claimed is:

1. A chopping aid device for use in chopping of firewood to prevent pieces of wood to spread into the surrounding outside the chopping aid device during chopping, the chopping aid device comprising: a basket-like cuff frame for chopped wood, the cuff frame is made of an elastomeric material providing dampening characteristics against impacts, an upper edge of the cuff frame is covered with a collar made of a harder material than the cuff frame and providing protection of the cuff frame against cuts, wherein the cuff frame and the collar are open at a front side or user side, and wherein the cuff frame comprises an upper edge whose distance from a bottom of the cuff frame is smaller at the front side or user side than the distance from the bottom at a direction of a side which differs from the front side.

2. A chopping aid device according to claim 1, wherein a hardness of the collar is 50 to 130 on the Rockwell R-scale and a Shore A hardness of the cuff frame is 20 to 80.

3. A chopping aid device for use in chopping of firewood to prevent pieces of wood to spread into the surroundings outside the chopping aid device during chopping, the chopping aid device comprising: a basket-like cuff frame for chopped wood, the cuff frame is made of an elastomeric material providing dampening characteristics against impacts, an upper edge of the cuff frame is covered with a collar made of a harder material than the cuff frame and providing protection of the cuff frame against cuts, and a straining strap is attached to a bottom of the cuff frame for adjusting a diameter of the bottom of the cuff frame.

4. A chopping aid device according to claim 3, wherein the cuff frame and the collar are open at a front side or user side.

5. A chopping aid device according to claim 3, wherein the cuff frame is cylindrical and in that the collar is cylindrical.

6. A chopping aid device according to claim 5, wherein the slot is at a front side of the cuff frame which the front side is directed against the user.

7. A chopping aid device according to claim 3, wherein the cuff frame is cylindrical and in that the collar is cylindrical.

8. A chopping aid device according to claim 7, wherein a lower region of an inner wall of the cuff frame comprises a circular bead.

9. A chopping aid device according to claim 7, wherein the collar is rotatable with respect to the cuff frame.

10. A chopping aid device according to claim 1, wherein the collar is molded to the cuff frame providing an integrated construction comprising the collar and the frame.

11. A chopping aid device according to claim 3, wherein a hardness of the collar is 90 to 120 on the Rockwell R-scale and a Shore A hardness of the cuff frame is 30 to 70.

* * * * *